United States Patent
Mayer et al.

(10) Patent No.: US 8,150,393 B2
(45) Date of Patent: Apr. 3, 2012

(54) METHOD FOR HANDLING SERVICE FAILURES

(75) Inventors: Georg Mayer, Helsinki (FI); Tao Haukka, Oulu (FI); Hannu Hietalahti, Kiviniemi (FI); Miikka Poikselkä, Espoo (FI)

(73) Assignee: Nokia Corporation, Espoo (FI)

( * ) Notice: Subject to any disclaimer, the term of this patent is extended or adjusted under 35 U.S.C. 154(b) by 300 days.

(21) Appl. No.: 10/581,207

(22) PCT Filed: Oct. 21, 2004

(86) PCT No.: PCT/IB2004/003573
§ 371 (c)(1),
(2), (4) Date: Nov. 9, 2006

(87) PCT Pub. No.: WO2005/039108
PCT Pub. Date: Apr. 28, 2005

(65) Prior Publication Data
US 2007/0275710 A1 Nov. 29, 2007

(30) Foreign Application Priority Data

Oct. 21, 2003 (GB) .................................. 0324597.4

(51) Int. Cl.
*H04W 4/00* (2009.01)
*H04W 24/00* (2009.01)
*H04L 29/06* (2006.01)
*H04N 7/16* (2006.01)

(52) U.S. Cl. ................... 455/435.1; 455/423; 455/422.1; 713/150; 725/4

(58) Field of Classification Search .................. 455/423, 455/422.1, 406
See application file for complete search history.

(56) References Cited

U.S. PATENT DOCUMENTS

| 5,917,537 | A * | 6/1999 | Lightfoot et al. ................. 725/4 |
| 2003/0191831 | A1 | 10/2003 | Hu et al. |
| 2004/0153667 | A1 * | 8/2004 | Kastelewicz et al. ......... 713/201 |
| 2004/0203710 | A1 * | 10/2004 | Gabor et al. ............... 455/422.1 |
| 2004/0225878 | A1 * | 11/2004 | Costa-Requena et al. .... 713/150 |

(Continued)

FOREIGN PATENT DOCUMENTS

JP 08-249249 9/1996

(Continued)

OTHER PUBLICATIONS

3rd Generation Partnership Project—3GPP TS 32.225 v2.0.0 (Sep. 2002).*

(Continued)

*Primary Examiner* — Dwayne Bost
*Assistant Examiner* — Timothy Pham
(74) *Attorney, Agent, or Firm* — Harrington & Smith

(57) ABSTRACT

A method for handling service failures for in a communications network comprising a user equipment, a first network element and a serving network element, the method comprising the following steps. Receiving at the first network element a first message from the user equipment. Transmitting the first message from the first network element to the serving network element. Detecting at the first network element that the serving network element is out of service. Determining at the first network element the type of the first message, and in dependence on the type of the first message sending from the first network element to the user equipment an error message including an indication that the serving network element is out of service.

23 Claims, 5 Drawing Sheets

U.S. PATENT DOCUMENTS

2005/0009520 A1* 1/2005 Herrero et al. ............ 455/435.1

FOREIGN PATENT DOCUMENTS

| JP | 2000-049781 | 2/2000 |
| WO | WO 02/091785 A1 * | 11/2002 |

OTHER PUBLICATIONS

"Digital Cellular Telecommunications System (Phase 2+); Universal Mobile Telecommunications System (UMTS); IP Multimedia Call Control Protocol based on SIP and SDP; Stage 3 (3GPP TS 24.229 version 5.5.0 Release 5); ETSI TS 124 229" ETSI Standards, European Telecommunications Standards Institute, vol. 3-CN1, No. V550, Jun. 2003, XP014008077.

"Interoperability Specifications (IOS) for cdma2000 Access Network Interfaces" TIA/EIA Interim Standard, Online, Dec. 2000, p. 01-04, I-XVI, 236-239, 729-730, XP002334151, Retrieved from the Internet: URL:http://www.tiaonline.org/standards/sfg/imt2k/cdma2000/TIA-ETA-IS-2001.pdf, retrieved on Jun. 30, 2005.

Official communication issued in the corresponding Japanese Patent Application No. 2006-536213, mailed on Aug. 19, 2008.

3GPP TS 24.229, v5.5.0, 3rd Generation Partnership Project; Technical Specification Group Core Network; IP Multimedia Call Control Protocol based on SIP and SDP; Stage 3, Release 5, Jun. 2003.

* cited by examiner

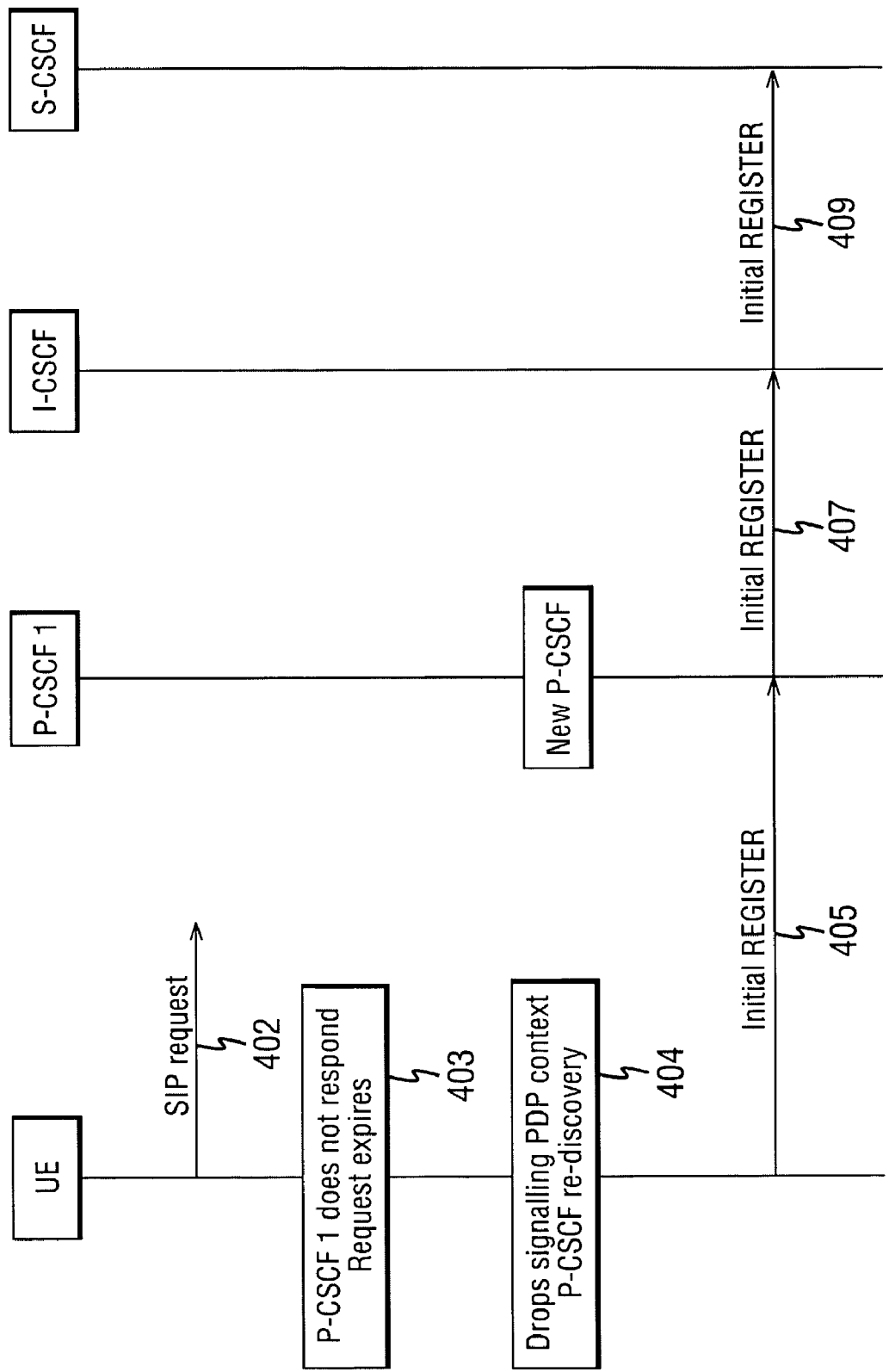

METHOD FOR HANDLING SERVICE FAILURES

FIELD OF THE INVENTION

The present invention relates to communication systems, and in particular, the control of communication sessions in a IP multimedia subsystem.

DESCRIPTION OF THE RELATED ART

A communication system can be seen as a facility that enables communication sessions between two or more entities such as user equipment and/or other nodes associated with the communication system. The communication sessions may support the communication of, for example, communication of voice, data, multimedia and so on. User equipment may, for example, be provided by means of a communications session with a two-way telephone call or multi-way conference call. User equipment may also be provided by means of a communications session with a connection to an application providing entity, for example to an application server (AS), thus enabling use of services provided by the application server.

A communication system typically operates in accordance with a given standard or specification. The standard or specification sets out what the various entities associated with the communication system are permitted to do and how that should be achieved. For example, the standard or specification may define if the user, or more precisely, user equipment is provided with a circuit switched service and/or a packet switched service. Communication protocols and/or parameters used for the connection may also be defined. In other words, a specific set of "rules" on which the communication can be based on needs to be defined to enable communication by means of the system.

Communication systems providing wireless communication for user equipment are known. An example of the wireless systems is the public land mobile network (PLMN). Another example is a mobile communication system that is based, at least partially, on use of communication satellites. Wireless communications may also be provided by means of other arrangements, such as by means of wireless local area networks (WLAN). Communication on the wireless interface between the user equipment and the elements of the communication network can be based on an appropriate communication protocol. The operation of the station apparatus of the communication system and other apparatus required for the communication can be controlled by one or several control entities. The various control entities may be interconnected. One or more gateway nodes may also be provided for connecting a communication network to other networks. For example, a mobile network may be connected to communication networks such as an IP (Internet Protocol) and/or other packet switched data networks.

An example of the services that may be offered for users of a communication system is the so called multimedia services. An example of the communication systems enabled to offer multimedia services is the Internet Protocol (IP) Multimedia network. IP Multimedia (IM) functionalities can be provided by means of a IP Multimedia Core Network (CN) subsystem, or abbreviated to IP Multimedia subsystem (IMS). The IMS includes various network entities for the provision of the multimedia services.

The Third Generation Partnership Project (3GPP) has defined use of the General Packet Radio Service (GPRS) as an IP connectivity access network for the provision of the IMS services, the GPRS being given herein as a non-limiting example of a possible IP connectivity access network enabling the multimedia services. The Third Generation Partnership Project (3GPP) has also defined a reference architecture for the third generation (3G) network which will provide the users of user equipment with access to the multimedia services.

The IP Multimedia Subsystem supports the Session Initiation Protocol (SIP) as developed by the Internet Engineering Task Force (IETF) in RFC 3261. Session Initiation Protocol (SIP) is an application-layer control protocol for creating, modifying and terminating sessions with one or more participants (endpoints).

Before a user equipment is able to communicate with an IP Multimedia subsystem, a GPRS attach procedure must be performed and a communication channel known as Packet Data Protocol (PDP) context for SIP signaling must be established. The PDP context is established towards the GGSN in the home or visited network. The PDP context will provide the user equipment with an appropriate IP address. This address may then serve as the host address for the duration of the PDP context. The PDP context where the SIP signaling is performed must be available as long as services from the IP Multimedia subsystem are wanted. This requirement is not limited to GPRS access and PDP contexts, but may apply also to other types of access systems and communication channels.

The communication systems have developed in the direction wherein various functions of the network are handled by appropriate controller entities. A user may access services via a data network via a chain of controllers. These controllers are typically provided by means of servers. IMS specifications define different kinds of SIP servers via which services may be accessed. These controllers provide functions such as the call session control functions (CSCFs). It shall be appreciated that the CSCFs may be also referenced to as the call state control functions.

The call session functions may be divided into various categories such as a proxy call session control function (P-CSCF), interrogating call session control function (I-CSCF), and serving call session control function (S-CSCF). The user needs to be registered at the serving call session control function (S-CSCF) in order to be able to request for a service from the communication system. A proxy call session control function (P-CSCF) in turn, is for proxying communications between a user and a serving call session control function (S-CSCF) the user is registered with. In other words, after registration to an IMS data network a user has an outbound proxy (typically a P-CSCF) and a register (S-CSCF) assigned. Any activity of the user goes through these data network controller entities.

However there are times when a controlling function server such as a S-CSCF or P-CFCS goes out of service. In some cases, like in the case of a failure or a software upgrade, a S-CSCF or P-CSCF may have to be shut down.

All users connected to the home network using these servers may then experience service discontinuity and may not be able to change their communication requirements. Communication may be usually continued by restarting the user equipment. This is required since the data carrier, will be dropped, and needs to be re-established. Also users may not be aware that the controller function has been or will be shut down, and therefore cannot themselves decide to initiate any recovery procedures.

To overcome the problem of having to restart the user equipment in every situation a simpler solution has to overcome several practical problems. Firstly, identifying the error, and the location of the out of service server. Secondly, is the out of service server is the S-CSCF, how an I-CSCF selects another S-CSCF? Thirdly, the handling of the signaling and multimedia data streams, in other words the active dialogs that the user has established with other user equipment (UE) and application servers (AS). Fourthly informing other network entities, such as application servers (AS) and P-CSCF network elements of new registration details.

It shall be appreciated that although the above discussed the registration proceedings and related problems with reference to an internet protocol (IP) based third generation (3G) communication system and session initiation protocol (SIP), similar disadvantages may be associated with other systems as well and thus the description is not limited to these examples

SUMMARY OF THE INVENTION

Embodiments of the present invention aim to address one or several of the above problems.

According to one embodiment of the present invention a method for handling service failures in a communications network comprising a user equipment, a first network element and a serving network element, the method comprising the steps of: receiving at the first network element a first message from the user equipment; transmitting the first message from the first network element to the serving network element; detecting at the first network element that the serving network element is out of service, determining at the first network element the type of the first message; and in dependence on the type of the first message sending from the first network element to the user equipment an error message including an indication that the serving network element is out of service.

The method may comprise the further step of: receiving at the user equipment the error message.

The method may further comprise the step of: subsequent to receiving the error message at the user equipment, sending a second message of a second type different from the type of the first message to initiate a registration from the user equipment to the communications network.

The method may further comprise prior to receiving at the first network element a first message from the user equipment the step of: establishing a bearer for signaling between the user equipment and the first network element.

The method may select a further serving network element and forward the message to the further serving network element.

The method may comprise the further steps of: registering at the further serving network element the user equipment.

The bearer for signaling may be a signaling or general purpose PDP context

The communications network may be an Internet Protocol multimedia subsystem (IMS) network.

The first network element may be an Interrogating Call Session Control Function (I-CSCF).

The first network element may be a Proxy Call Session Control Function (P-CSCF).

The serving network element may be a Serving Call Session Control Function (S-CSCF).

The step of determining a type of message may comprise determining the type of message based on the content of a predefined information element in the message.

The step of detecting at the first network element that the serving network element in a communications network is out of service, may comprise the step of: detecting that a predetermined time period has passed since the forwarding of the message from the first network element to the serving network element and before a response has been received from the serving network element and/or determining that the first message has been transmitted a predetermined number of times.

The type of the first message may be a re-registration request.

The type of the second message may be an initial registration request.

The information element may indicate that the request is sent integrity protected.

The information element may indicate that the user has been successfully authenticated.

The information element in the message may be an integrity protected flag in an Authorization header of the message.

According to a second aspect of the present invention there is provided a network element in a communications network further comprising a serving network element and a user equipment, wherein the network element is arranged to: receive a first message from the user equipment; forward the first messages to the serving network element; detect that the serving network element is out of service; determine the type of the first message; and in dependence on the type of the first message received from the user equipment send an error message to the user equipment.

The network element may be further arranged to receive a further message of a second type different from the type of the first message from the user equipment.

According to a third aspect of the present invention there is provided a user equipment in a communications network further comprising a first network element and a serving network element, wherein the user equipment is arranged to receive an error message from the first network element, the error message indicating that the serving network element for the user equipment is out of service, and respond to the error message by sending a further message of a second type different to the first type to the first network element.

The user equipment may be further arranged to establish a bearer for signaling between the user equipment and the communications network and further arranged to respond to the error message by dropping the bearer for signaling between the user equipment and the communications network.

The bearer for signaling may be a signaling or general purpose PDP context bearers.

The type of the further message sent to the first network element may be an initial registration request.

According to a fourth aspect of the present invention there is provided a user equipment for operation in a communications network comprising a network element, the user equipment being arranged to determine that the first network element is out of service by sending a request to the first network element and determining that no response has been received from the first network element; wherein the user equipment is arranged to on determining that the first network element is out of service, to drop a bearer for signaling between the user equipment and the communications network, discover or select a new a further first network element; and send to the further network element a message comprising an initial request for registration at the communications network.

According to a fifth aspect of the present invention there is provided a method for handling service failures in a communications network, the communications network comprising: a user equipment; a first network element; and a further network element, the method comprising the steps of: sending from the user equipment to the first network elements a first message, detecting at the user equipment that the first network element is out of service, dropping the signaling bearer from the user equipment to the communications network; selecting or discovering at the user equipment the further network element; sending from the user equipment to the further network element a message comprising an initial registration request.

According to a sixth aspect of the invention there is provided a method for determining a type of registration in a communications network comprising at least a user equipment and a network element, comprising the steps of: receiving at the network element a request for registration from the user equipment; detecting at the network element an information element in the received request; determining the content of the information element, and in dependence on the determined content of the information element determining whether the registration request is for a first type of registration or for a second type of registration.

The communications network may further comprises at least one serving network element and the method may comprises the further steps of: transmitting the request from the first network element to the serving network element; detecting the service network is out of service by receiving no response from the serving network element, sending an serving network element out of service message to the user equipment, if the registration request is the first type of registration request, selecting a further serving network element by the first network element if the register request is for the second type of registration.

The first type of registration may be a re-registration and the second type of registration may be an initial registration.

According to a seventh aspect of the invention there is provided a network element in a communications network further comprising a user equipment, wherein the network element is arranged to: receive a request for registration from the user equipment; detect an information element within the received registration request; determine the content of the information element, and in dependence on the determined content of the information element to determine whether the received registration request is a first type of registration or a second type of registration.

The information element may indicate that the request is sent integrity protected.

The information element may indicate that the user has been successfully authenticated.

The information element in the message may be an integrity protected flag.

A communications system may comprise a network element described above, and a user equipment as claimed above.

An embodiment of the present invention describes a method for handling service failures in a communications network, the method may comprise the steps of: establishing a bearer for signaling between a user equipment and the communications network, registering as a first type of registration the user equipment to a serving network element in a communications network, detecting by a first network element that the serving network element in a communications network is out of service, sending from the first network element to the user equipment a message including an indication that the serving network element is out of service.

A further embodiment describes the method may further comprise the step of: initiating a registration of a second type by the user equipment to the communications network.

A further embodiment describes the method may further comprise the further step of: receiving by the user equipment an indication from the first network element that a network element is out of service in a communications network in response to a message sent by the user equipment.

A further embodiment describes a method wherein the first network element may be a P-CSCF.

Additional embodiments describe a method which may further comprise the steps of: detecting by a first network element that the serving network element is out of service during the second type of registration, dropping the bearer for signaling by the user equipment in response to receiving the message from the first network element, registering a first type of registration to the communications network by the user equipment, establishing a second bearer for signaling between the user equipment and the communications network.

Further embodiments describe the bearer for signaling may be a signaling or general purpose PDP context, the communications network may be an IMS network, the first type of registration may be an initial registration, the second type of registration may be a re-registration, the first network element may be an Interrogating CSCF (I-CSCF) and the serving network element may be a S-CSCF.

Additional embodiments describe a method for determining a type of registration in a communications network which may comprising the steps of: sending a request for register from an user equipment to a first network element, checking in the first network element an information element in the request, determining based on said result of the checking step, if the register request is for a first type of registration or for a second type of registration.

Further embodiments describe the method may comprise further steps of: receiving no response from a serving network element, sending an serving network element out of service message to the UE, if the register request is for first type of registration, selecting a new serving network element by the first network element if the register request is for the second type of registration.

Additional embodiments describe wherein the first type of registration may be a re-registration and the second type of registration may be an initial registration.

Further embodiments describe the method, wherein the checking step may check the presence of the information element in the request.

Additional embodiments describe the information element may indicate that the request is sent integrity protected.

Further embodiments describe the information may indicate that the user has been successfully authenticated.

Additional embodiments describe the information in the request may be an integrity protected flag.

Embodiments describe a network element in a communications network may be arranged to have means for sending message to and/or from a serving network element, means for detecting the information that serving network element is not capable of serving an user equipment and means for sending the information to the user equipment.

Further embodiments describe the network element in a communications network may be arranged to have means for receiving registration request and means for checking if the registration request is of a first type or a second type.

Additional embodiments describe the network element in a communications network may be arranged to have means for receiving messages from an user equipment and means for sending a message to the user equipment, the message indicating that a network element in the communications network is not capable of serving the user equipment.

Embodiments describe a user equipment in a communications network may be arranged to have means for receiving a message from the communications network, the message indicating that the serving network element for the user equipment is not capable of serving the user equipment, and means for responding to the message by releasing bearers.

Further embodiments describe the user equipment may be arranged to have means to perform initial registration for responding to the message.

Embodiments may provide a way of avoiding discontinuity in the communication between user equipment and application server. The user perception may be improved since the user does not necessarily notice any temporary failures. Neither may the user be required to intervene to re-establish communications with the network should a failure occur in a serving controller entity.

BRIEF DESCRIPTION OF THE DRAWINGS

For better understanding of the present invention, reference will now be made by way of example to the accompanying drawings in which:

FIG. 5 is a flow diagram of the signaling flow of an example of a further embodiment of the present invention in use.

DETAILED DESCRIPTION OF THE PREFERRED EMBODIMENTS

Certain embodiments of the present invention will be described in the following by way of example, with reference to the exemplifying architecture of a third generation (3G) mobile communications system. However, it shall be appreciated that the embodiments may be applied to any suitable communication system. For example a suitable communications system may be a CDMA 2000 system.

Figure 1:
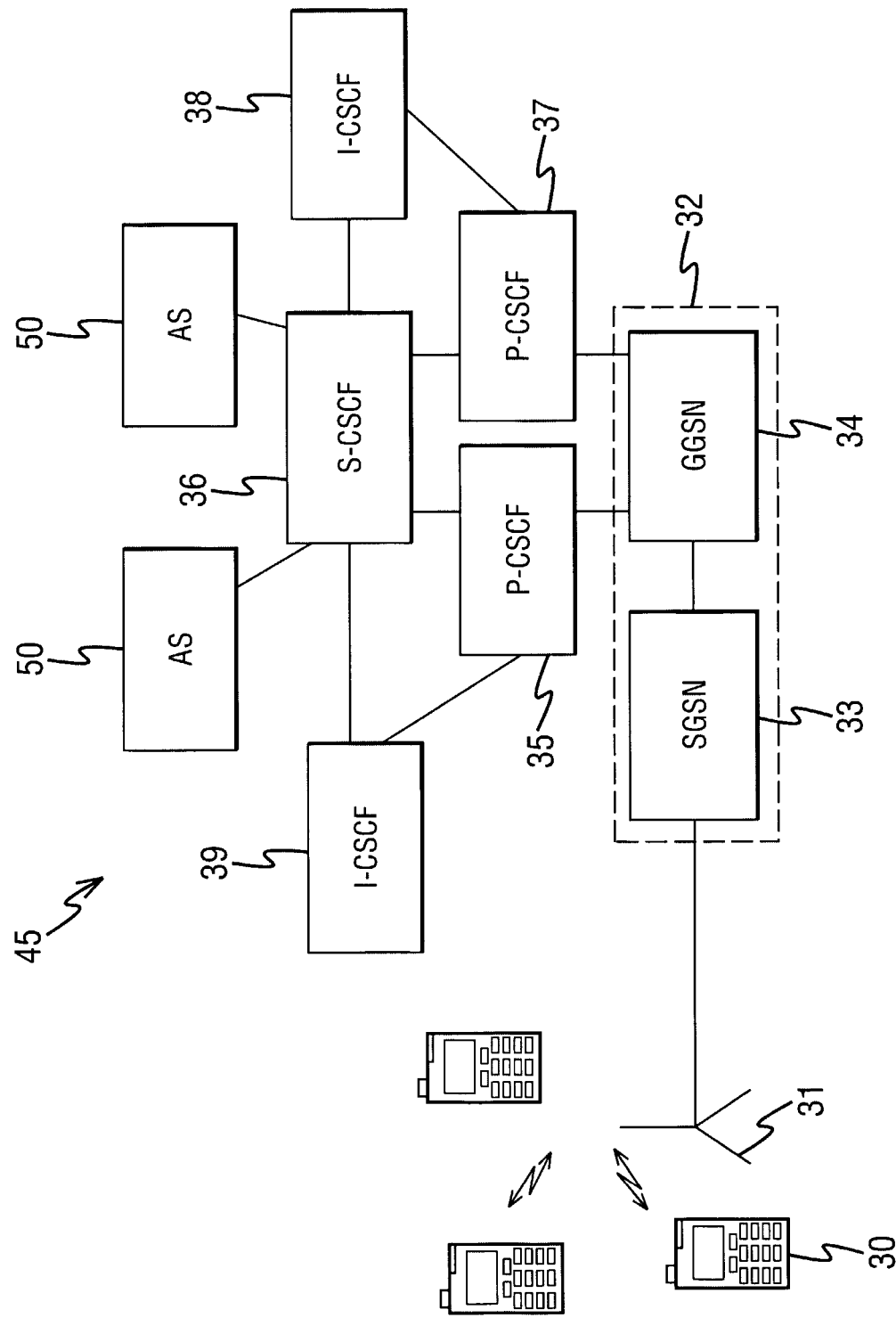
FIG. 1 shows a communication system environment wherein the invention can be embodied.

Reference is made to FIG. 1 which shows an example of a network architecture wherein the invention may be embodied. In FIG. 1 an IP Multimedia Network 45 is provided for offering IP multimedia services for IP Multimedia Network subscribers.

As described above, access to IP Multimedia (IM) services can be provided by means of a mobile communication system. A mobile communication system is typically arranged to serve a plurality of mobile user equipment usually via a wireless interface between the user equipment and at least one base station 31 of the communication system. The mobile communication system may logically be divided between a radio access network (RAN) and a core network (CN).

The base station 31 is arranged to transmit signals to and receive signals from a mobile user equipment 30 via a wireless interface between the user equipment and the radio access network. Correspondingly, the mobile user equipment 30 is able to transmit signals to and receive signals from the radio access network via the wireless interface.

In the shown arrangement the user equipment 30 may access the IMS network 45 via the access network associated with the base station 31. It shall be appreciated that, although, for clarity reasons FIG. 1 shows a base station of only one radio access network, a typical communication network system usually includes a number of radio access networks.

The 3G radio access network (RAN) is typically controlled by appropriate radio network controller (RNC). This controller is not shown in order to enhance clarity. A controller may be assigned for each base station or a controller can control a plurality of base stations, for example in the radio access network level. It shall be appreciated that the name, location and number of the radio network controllers depends on the system.

The mobile user equipment 30 of FIG. 1 may comprise any appropriate mobile user equipment adapted for Internet Protocol (IP) communication to connect the network. For example, the mobile user may access the cellular network by means of a Personal computer (PC), Personal Data Assistant (PDA), mobile station (MS) and so on. The following examples are described with reference to mobile stations.

One skilled in the art is familiar with the features and operation of a typical mobile station. Thus, it is sufficient to note that the user may use a mobile station for tasks such as for making and receiving phone calls, for receiving and sending data from and to the network and for experiencing multimedia content or otherwise using multimedia services. A mobile station may include an antenna for wirelessly receiving and transmitting signals from and to base stations of the mobile communication network. A mobile station may also be provided with a display for displaying images and other graphical information for the user of the mobile user equipment. Camera means may be provided for capturing still or video images. Speaker means are also typically provided. The operation of a mobile station may be controlled by means of an appropriate user interface such as control buttons, voice commands and so on. Furthermore, a mobile station is provided with a processor entity and a memory means.

It shall be appreciated that although only few mobile stations are shown in FIG. 1 for clarity, a great number of mobile stations may be in simultaneous communication with a communication system.

A core network (CN) typically includes various switching and other control entities and gateways for enabling the communication via a number of radio access networks and also for interfacing a single communication system with one or more communication system such as with other cellular systems and/or fixed line communication systems. In the 3GPP systems the radio access network is typically connected to an appropriate core network entity or entities such as, but not limited to, a serving general packet radio service support node (SGSN) 33. The radio access network is in communication with the serving GPRS support node via an appropriate interface, for example on an Iu interface. The serving GPRS support node, in turn, typically communicates with an appropriate gateway, for example a gateway GPRS support node 34 via the GPRS backbone network 32. This interface is commonly a switched packet data interface.

In a 3GPP network, a packet data session is established to carry traffic flows over the network. Such a packet data session is often referred as a packet data protocol (PDP) context. A PDP context may include a radio bearer provided between the user equipment and the radio network controller, a radio access bearer provided between the user equipment, the radio network controller and the SGSN 33, and switched packet data channels provided between the serving GPRS service node 33 and the gateway GPRS service node 34. Each PDP context usually provides a communication pathway between a particular user equipment and the gateway GPRS support node and, once established, can typically carry multiple flows. Each flow normally represents, for example, a particular service and/or a media component of a particular service. The PDP context therefore often represents a logical communication pathway for one or more flow across the network. To implement the PDP context between user equipment and the serving GPRS support node, at least one radio access bearer (RAB) needs to be established which commonly allows for data transfer for the user equipment. The implementation of these logical and physical channels is known to those skilled in the art and is therefore not discussed further herein.

FIG. 1 shows also a plurality of application servers 50 connected to the exemplifying Internet Protocol (IP) Multimedia network 45. The user equipment 30 may connect, via the GPRS network 32 and an IMS network 45, to at least one of the application servers 50. It shall be appreciated that a great number of application servers may be connected to a data network.

Communication with the application servers is controlled by means of functions of the data network that are provided by appropriate controller entities. For example, in the current third generation (3G) wireless multimedia network architectures it is assumed that several different servers providing various control functions are used for the control. These include functions such as the call session or call state control functions (CSCFs). The call session functions may be divided into various categories. FIG. 1 shows proxy call session control functions (P-CSCF) 35, and 37, an interrogating call session control function (I-CSCF) 38 and 39, and a serving call session control function (S-CSCF) 36. It shall be appreciated that similar functions may be referred to in different systems with different names.

A user who wishes to use services provided by an application server via the IMS system may need first to register with a serving controller, such as the serving call session control function (S-CSCF) 36. The registration may be required to enable the user equipment to request for a service from the multimedia system. As shown in FIG. 1, communication between the S-CSCF 36 and the user equipment 30 may be routed via at least one proxy call session control function (P-CSCF) 35. The proxy CSCF 35 thus acts as a proxy which forwards messages from the GGSN 34 to a serving call session control function 36 and vice versa.

In a registration procedure, the UE sends an initial registration request to the network. The request is routed via CSCF(s) to a S-CSCF that takes care of authentication the user and it binds the IP address of the UE to the user's identity. The registration is valid for certain time and it is the UE's task to keep the registration alive. For this purpose the UE sends a new registration request to the S-CSCF before the registration expires. This procedure is called as a re-registration procedure.

Figure 2:
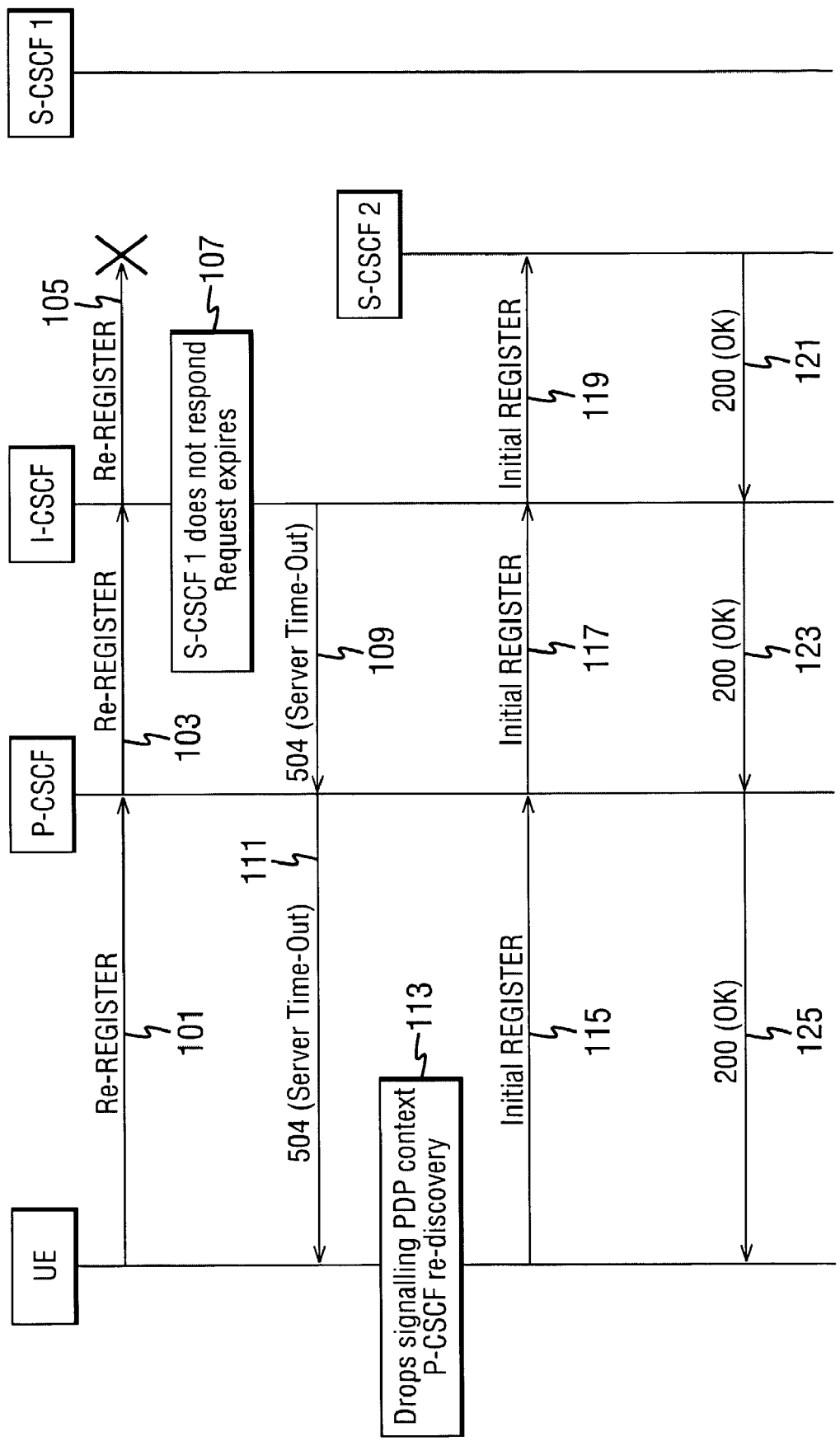
FIG. 2 is a flow diagram of the signaling flow of an example of the first embodiment of the present invention.

FIGS. 2 to 5 show a series of examples of embodiments of the present invention. With reference to FIG. 2, an embodiment of the present invention is shown where the communications system is shown recovering from a S-CSCF out of service error, the detection of such an error being found in response to a re-registration request. As is known in the art following the initial registration of the user (described in 3GPP TS 23.228), and before the validity of the registration expires the UE sends a re-registration request to the S-CSCF.

In the first step 101, the user equipment (UE) sends the re-registration request to the P-CSCF.

In the second step 103 the P-CSCF, receives the re-registration request, and forwards the message to the I-CSCF.

In the third step 105 the I-CSCF, receives the re-registration request from the P-CSCF, and attempts to pass the request onto the S-CSCF. As the S-CSCF is out of service it is unable to respond to the request.

As the S-CSCF is unable to respond to the request the timer within the I-CSCF expires after a predetermined time and, in step 107, the I-CSCF stops attempting to contact the S-CSCF with the request. The I-CSCF may attempt to send the request several, predetermined number of times.

In the fourth step 109, the I-CSCF transmits an error indication, e.g. a server timeout error message (also known as a 504 error message) back to the P-CSCF.

In the fifth step 111, the P-CSCF receives the 504 error message and passes the 504 error message back to the user equipment (UE).

In the sixth step 113, the UE receives the 504 error message. The UE then drops all signaling and data traffic relating to that re-registration process.

In some embodiments of the present invention the user equipment only drops the signaling information related to the signaling PDP context but retains the multimedia PDP contexts. In this further embodiment the user equipment is allowed to maintain contact with the remote service/terminal whilst the second part of the embodiment of the present invention attempts to resolve the S-CSCF error. In other embodiments of the present invention where a general PDP context had been established the general PDP context is dropped.

In the seventh step 115, the user equipment transmits an initial registration request to the P-CSCF. The UE initial registration is the first step in re-establishing communication by establishing a new signaling PDP context or using an existing signaling PDP context. (In embodiments where a general context had been dropped the UE attempts to establish a new general PDP context.)

In the eighth step 117, the P-CSCF receives the request from the UE and passes the initial registration request to the I-CSCF.

In the ninth step 119, the I-CSCF receives the request and selects a second S-CSCF2 for the user.

The second S-CSCF (S-CSCF2) in step 121 transmits a positive acknowledge signal (also known as a 200 ok message) to the I-CSCF.

The I-CSCF transmits the received 200 ok message to the P-CSCF in the step 123.

The P-CSCF in step 125, transmits the received 200 ok message to the user equipment.

Such a method although being perceived as a heavy procedure—as it leads to a complete break in service provision to the user and any remote user connected to the user, is more efficient in not requiring a hard reset of the UE. Also such a procedure 'clears up' any remaining states in the UE and in the network.

Figure 4:
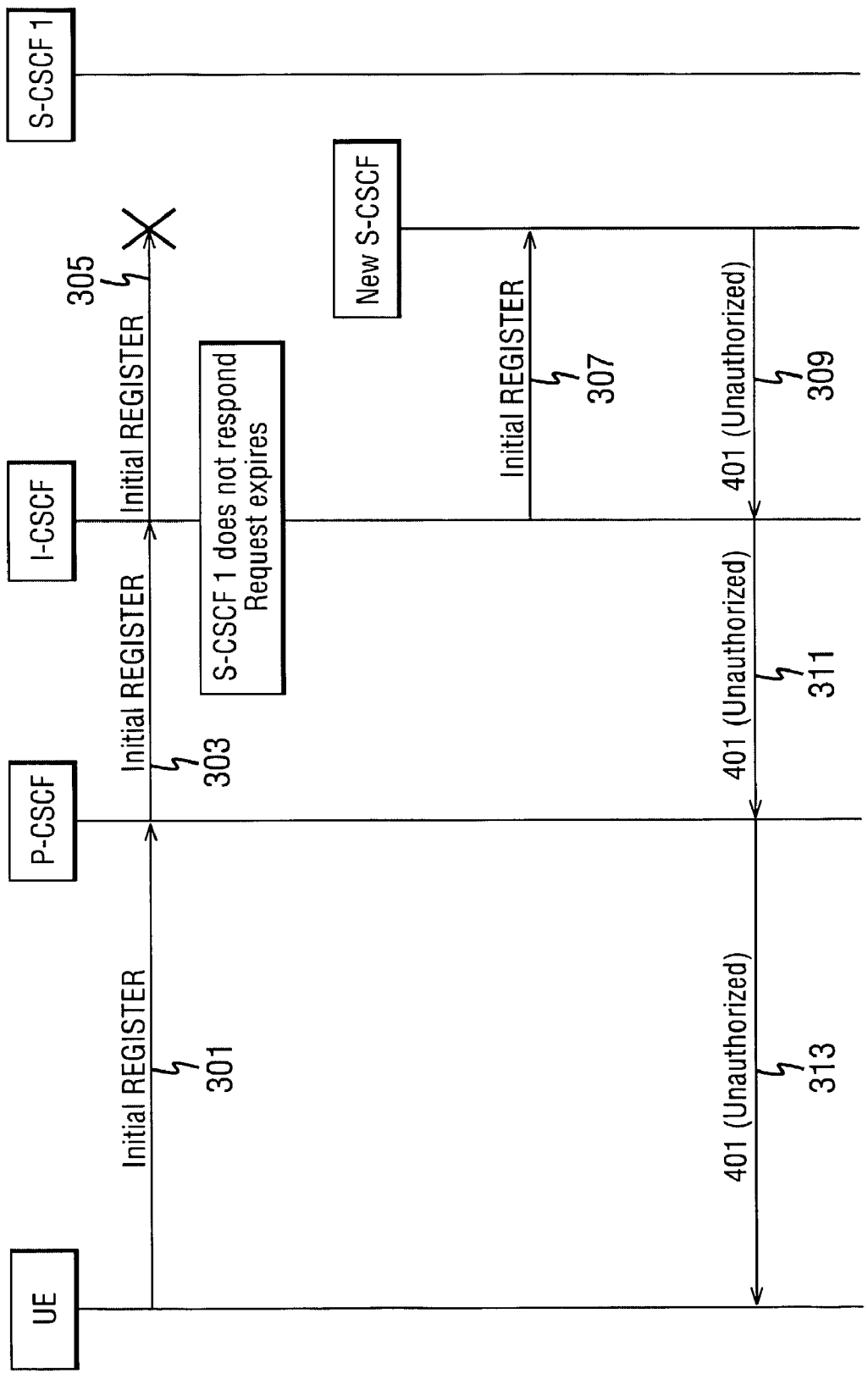
FIG. 4 is a flow diagram of the signaling flow of an example of a further example of embodiments of the present invention in use.

The problem of how the I-CSCF determines whether the current timed out request is either a re-registration or initial registration request can be seen with respect to FIG. 4.

With reference to FIG. 4, the determination of whether the I-CSCF is processing an initial registration or a re-registration request is further discussed. FIG. 4 shows an example where an initial registration is being processed and the S-CSCF addressed by the I-CSCF is out of service.

In the steps 301, 303 and 305, the initial registration request is transmitted from the UE to the P-CSCF (step 301), then retransmitted from the P-CSCF to the I-CSCF (step 303), then attempted to be retransmitted from the I-CSCF to the S-CSCF (step 305)—in the first attempt the S-CSCF addressed is S-CSCF 1.

In step 307, the failure of S-CSCF 1 to return a response message causes the I-CSCF timer to expire and therefore indicating that the request has expired. The I-CSCF may attempt to retransmit the request several, predetermined number of times to the S-CSCF1.

The I-CSCF then determines whether the expired request was an initial registration or a re-registration request by examining the 'integrity-protected' flag in the request header.

As the integrity-protected flag is enabled only once the UE and the P-CSCF has formed a security association, an event performed following a successful authentication/registration, an absent 'integrity-protected' flag indicates to the I-CSCF that it is an initial registration process.

Therefore when an 'integrity-protected' flag is present in an expired request (such as produced when the S-CSCF is out of service) then the expired request triggers the I-CSCF to send a 504 error message to the UE via the P-CSCF as shown in the first embodiment example as described above.

When an 'integrity-protected' flag is not present in an expired request (such as produced when the S-CSCF is out of service) then the I-CSCF identifies that the request it is processing is a initial registration request and therefore the I-CSCF transmits according the method known in the art a new initial registration request to a different S-CSCF (New S-CSCF). This is shown in step 307.

If the UE is capable of being registered on the different S-CSCF, and the different S-CSCF is in service then the S-CSCF performs the act of registering and transmits a 200 ok message back to the UE via the I-CSCF and P-CSCF as is known in the art. In the example shown in FIG. 4 the UE is not authorised to use the different S-CSCF and therefore issues a 401 'unauthorised' message. The 401 message is transmitted back to the UE in steps 309, 311, and 313. In step 309 the message is passed from the S-CSCF to the I-CSCF, in step 311 the message is passed from the I-CSCF to the P-CSCF and in step 313 the message is passed from the P-CSCF to the UE.

Therefore in accordance with the two examples shown, embodiments of the invention can determine errors occurring to initial registration or re-registration requests and initialise a recovery dependent on the request type by examining an element or part of the request message header. Without such a method it would not be possible for the I-CSCF to determine what type of registration request it was processing and prevent endless loops being created, for example where the I-CSCF passed 504 time out messages for all registration requests back to the UE, and the UE passed new registration requests back to the I-CSCF which would be directed to the out of service S-CSCF only to cause a new timeout and a new 504 message to be passed to the UE.

A further embodiment of the present invention is described with reference to the example shown in FIG. 3. This embodiment shows further that a P-CSCF on receipt of a 504 message when processing a non registration request passes the 504 error message back to the UE, and the UE on the receipt of a 504 error message from a P-CSCF in response to a non-registration request performs a re-registration.

The Steps 201, 203 and 205 show an UE transmitting (step 201) a non-registration SIP format message via the P-CSCF (step 203) and S-CSCF (step 205) to an entity in the IP/SIP network, for example an application server (AS).

Due to an error somewhere within the IP/SIP network the request fails to reach its target and instead a 504 error message is returned to the UE (the 504 message returned is similar to the 504 message returned as described above). In steps 207, 209, and 211 this error message is passed back from the IP/SIP network (step 207) via the S-CSCF (step 209), the P-CSCF (step 211) and ends at the UE.

However the UE is unable to determine from the receipt of the error message, whether the error has originated from the S-CSCF or elsewhere. Therefore in order to determine the status of its S-CSCF it initiates, as shown in step 213, a re-registration request process as described above to determine if the error message originated at the S-CSCF.

Figure 3:
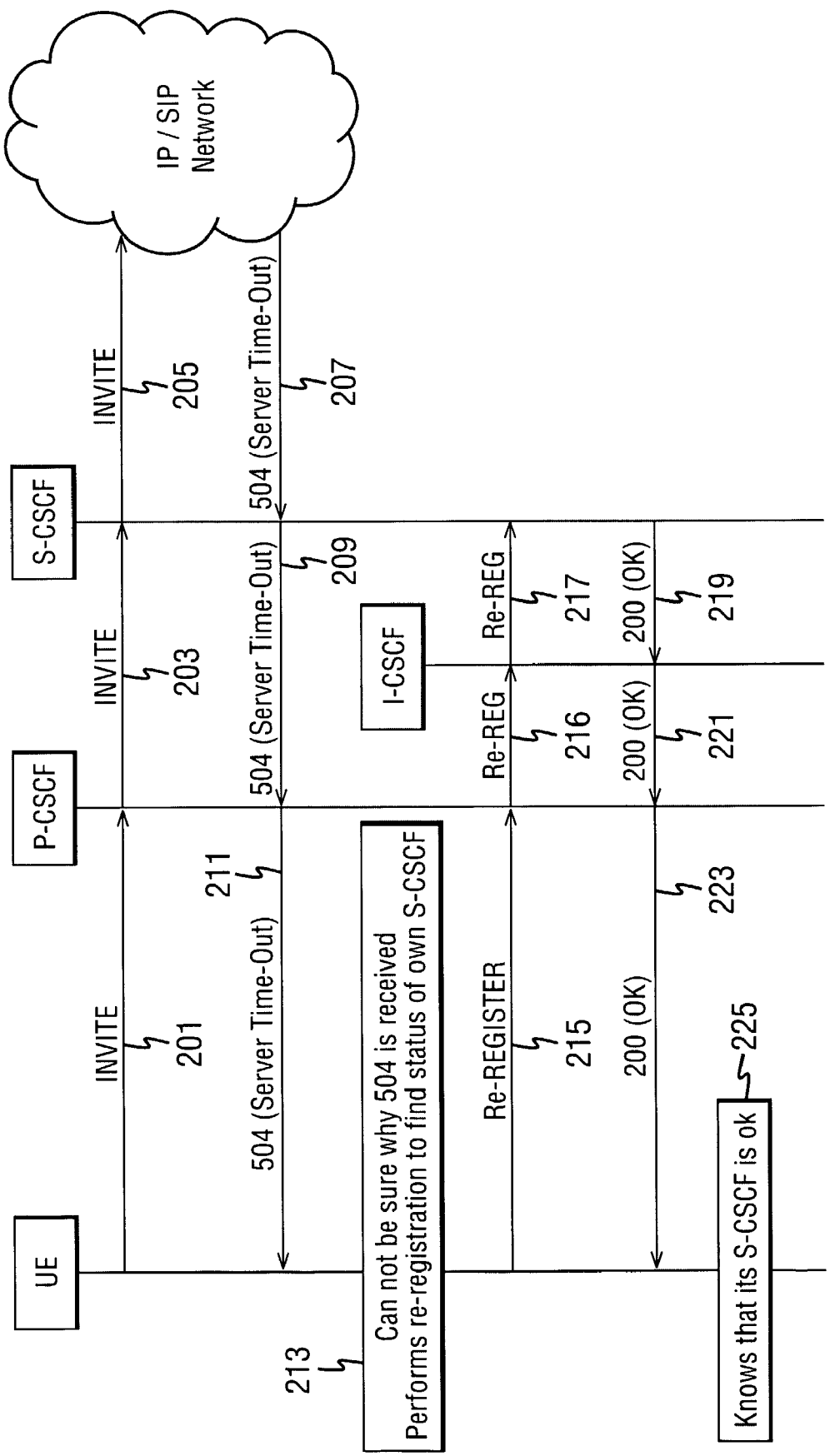
FIG. 3 is a flow diagram of the signaling flow of a further embodiment of the present invention.

This is shown in FIG. 3 by the steps 215, 216 and 217, where the re-registration request is transmitted by the UE (in step 215), received and retransmitted by the P-CSCF (in step 216) and received and retransmitted by the I-CSCF (in step 217) to the S-CSCF.

In the example shown in FIG. 3 the S-CSCF is in service and the re-registration process proceeds, with a 200 ok message being transmitted by the S-CSCF (in step 219), received and retransmitted by the I-CSCF (in step 221) and received and retransmitted by the P-CSCF to the UE (in step 223).

However if the S-CSCF was found to be the originator of the problem then the I-CSCF would pass back a further error message and the process would resolve itself in a manner described above using a new registration process.

With reference to FIG. 5 a further example showing a further embodiment of the invention is demonstrated. In the example shown in FIG. 5 the UE is registered and in step 402 is transmitting a SIP request message to the P-CSCF (P-CSCF1).

P-CSCF1 is out of service and does not respond. The UE timer expires and by step 403 the UE acknowledges that the request has expired.

In steps 404 and 405 the UE performs a similar method to that performed following a S-CSCF out of service situation. In the previous method described above the out of service situation produces a re-registration request failure, and the UE dropped the signaling PDP context or the general PDP context relating to the message. In step 404, the P-CSCF out of service failure produces a general request failure, which triggers the UE to drop the signaling PDP context or the general PDP context relating to the UE. In further embodiments of the present invention the UE further drops the multimedia PDP contexts. During the step 404 the UE may discover a new P-CSCF if it does not possess an alternative contact address for a P-CSCF1.

In steps 405, 407, and 409 the UE starts a new initial registration process. In step 405 the UE uses a new contact address of P-CSCF to send an initial registration request to the new P-CSCF (New P-CSCF). In step 407 the initial register request is received by the new P-CSCF and forwarded onto the I-CSCF. In step 409 the initial register request is received by the I-CSCF and transmitted from the -I-CSCF to the S-CSCF.

This further embodiment shows the present invention handling errors occurring when the P-CSCF goes out of service, in a manner similar to the S-CSCF out of service conditions.

It should be appreciated that whilst embodiments of the present invention have been described in relation to user equipment such as mobile stations, embodiments of the present invention are applicable to any other type of equipment that needs to be authenticated. For example the present invention could be applied to user equipment connecting to a IP/SIP network via a wireless local area network (WLAN) communications system.

The examples of the invention have been described in the context of an IMS system and GPRS networks. However, this invention is also applicable to any other standards. Furthermore, the given examples are described in the context of the so called all SIP networks with all SIP entities and communication channels known as PDP contexts. This invention is also applicable to any other appropriate communication systems, either wireless or fixed line systems, communication standards and communication protocols.

Examples of other possible communication systems enabling wireless data communication services, without limiting to these, include third generation mobile communication system such as the Universal Mobile Telecommunication System (UMTS), i-phone or CDMA2000 and the Terrestrial Trunked Radio (TETRA) system, the Enhanced Data rate for GSM Evolution (EDGE) mobile data network. Examples of fixed line systems include the diverse broadband techniques providing Internet access for users in different locations, such as at home and offices. Regardless the standards and protocols used for the communication network, the invention can be applied in all communication networks wherein registration in a network entity is required.

The embodiments of the invention have been discussed in the context of proxy and servicing call state control functions. Embodiments of the invention can be applicable to other network elements where applicable.

It is also noted herein that while the above describes exemplifying embodiments of the invention, there are several variations and modifications which may be made to the disclosed solution without departing from the scope of the invention as defined in the appended claims.

The applicant hereby discloses that the invention is not to be interpreted solely on the scope of claims.

It is understood that the term out of service can be interpreted as meaning that either the serving network element is not communicating with said user equipment due to a fault in the serving network element, or a fault in the communications network preventing the user equipment communicating the serving network element.

Furthermore it is understood that the user equipment can comprises mobile phones, personal communication devices, and personal data assistants.

It is further understood that the act of establishing a bearer for signaling can be understood to mean creating a communication session, and wherein the communication node is arranged to be capable of communication with a network by means of a communication session, the network comprising a session authorisation node for authorising establishment of a communication session; the communication node being arranged to, in order to establish a session, communicate with the session authorisation node for receiving authorisation of the session; the communication node being capable of, during a communication session, requesting the authorisation node for authorisation of the session and being arranged to terminate at least the signaling of the session in response to receiving from the network in response to such a request a message indicating a failure by the session authorisation node to respond to the request.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method, comprising:
receiving at a first network element in a communications network a first message from a user equipment;
transmitting the first message from the first network element to a serving network element;
detecting at the first network element that the serving network element is out of service;
determining at the first network element a type of the first message, wherein determining the type of the first message comprises evaluating content of a predefined information element in the first message;
in response to detecting at the first network element that the serving network element is out of service and to determining that the type of the first message is a re-registration request, sending from the first network element to the user equipment an error message including an indication that the serving network element is out of service; and
subsequent to sending the error message to the user equipment, receiving a second message having an initial registration type from the user equipment.

2. A method according to claim 1, wherein
the second message is configured to initiate a registration from the user equipment to the first network element.

3. A method according to claim 1, wherein
a bearer configured to signal is established between the user equipment and the communications network prior to the receiving of the first message.

4. A method according to claim 3, further comprising forwarding the first message to a further serving network element.

5. A method according to claim 4, wherein the further serving network element registers the user equipment.

6. A method according to claim 3, wherein the bearer comprises a signalling or general purpose packet data protocol context bearer.

7. A method according to claim 1 wherein the communications network is an internet protocol multimedia subsystem network.

8. A method according to claim 1 wherein the first network element comprises an interrogating call session control function.

9. A method according to the claim 1, wherein the first network element comprises a proxy call session control function.

10. A method according to claim 1 wherein the serving network element comprises a serving call session control function.

11. A method according to claim 1, wherein the detecting at the first network element that the serving network element is out of service comprises:
at least one of detecting that a predetermined time period has passed since the forwarding of the message from the first network element to the serving network element and before a response has been received from the serving network element, and determining that the first message has been transmitted a predetermined number of times.

12. A method according to claim 1, wherein the information element indicates that the first message is sent integrity protected.

13. A method according to claim 1, wherein the information element indicates that a user has been successfully authenticated.

14. A method according to claim 1, wherein the information element in the first message is an integrity protected flag in an authorization header of the first message.

15. An apparatus, comprising:
a controller configured to
receive a first message from a user equipment,
forward the first message to a serving network element,
detect that the serving network element is out of service, determine a type of the first message by evaluating content of a predefined information element in the first message, in response to detecting at the first network element that the serving network element is out of service and to determining that the type of the first message is a re-registration request, send an error message to the user equipment including an indication that the serving network element is out of service, and subsequent to the error message being sent to the user equipment, receive a second message having an initial registration type from the user equipment.

16. An apparatus according to claim 13, wherein the controller is further configured, detect that the serving network element is out of service, to detect that a predetermined time period has passed since the forwarding of the message from the apparatus to the serving network element and before a response has been received from the serving network element and/or determining that the first message has been transmitted a predetermined number of times.

17. An apparatus, comprising:
a controller configured to send a first message having a type of a re-registration request;
receive an error message from a network element in a communications network in response to the first message, the error message indicating that the network element has determined that a serving network element for the apparatus is out of service, and
in response to the error message, to send a further message having an initial registration type to the network element.

18. An apparatus according to claim 17, wherein the controller is further configured to
establish a bearer configured to signal between the apparatus and a communications network comprising said network element and said serving network element, and
respond to the error message by dropping the bearer between the apparatus and the communications network.

19. An apparatus according to claim 18 wherein the bearer comprises a signalling or general purpose packet data protocol context bearer.

20. A system, comprising:
a network element;
a serving network element in communication with the network element; and
user equipment in communication with said network element,
wherein said network element is configured to
receive a first message from the user equipment,
forward the first message to the serving network element,
detect that the serving network element is out of service,
determine a type of the first message by evaluating content of a predefined information element in the first message,
in response to detecting that the serving network element is out of service and to determining that the type of the first message is a re-registration request, send an error message to the user equipment including an indication that the serving network element is out of service, and
subsequent to sending the error message to the user equipment, receive a second message from the user equipment having an initial registration type.

21. A method comprising:
sending from a user equipment a first message having a type of a re-registration request;
receiving at the user equipment an error message from a network element in a communications network in response to the first message, the error message indication that the network element has determined that a serving network element for the user equipment is out of service; and
in response to the error message, sending from the user equipment a further message having an initial registration type to the network element.

22. A non-transitory computer readable medium configured to store instructions of a computer program that when executed controls a controller to perform:
receiving at a first network element in a communications network a first message from a user equipment;
transmitting the first message from the first network element to a serving network element;
detecting at the first network element that the serving network element is out of service;
determining at the first network element a type of the first message by evaluating content of a predefined information element in the first message;
in response to detecting at the first network element that the serving network element is out of service and to determining that the type of the first message is a re-registration request, sending from the first network element to the user equipment an error message including an indication that the serving network element is out of service; and
subsequent to sending the error message to the user equipment, receiving a second message having an initial registration type from the user equipment.

23. A non-transitory computer readable medium configured to store instructions of a computer program that when executed controls a controller to perform:
sending from a user equipment a first message having a type of a re-registration request;
receiving at the user equipment an error message from a network element in a communications network in response to the first message, the error message indication that the network element has determined that a serving network element for the user equipment is out of service; and
in response to the error message, sending from the user equipment a further message having an initial registration type.

* * * * *